(12) United States Patent
Terwilliger et al.

(10) Patent No.: US 12,286,907 B2
(45) Date of Patent: Apr. 29, 2025

(54) INCREASED WATER HEAT ABSORPTION CAPACITY FOR STEAM INJECTED TURBINE ENGINE

(71) Applicant: RTX CORPORATION, Farmington, CT (US)

(72) Inventors: Neil J. Terwilliger, Cheshire, CT (US); Joseph B. Staubach, Colchester, CT (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/625,755

(22) Filed: Apr. 3, 2024

(65) Prior Publication Data

US 2024/0271550 A1    Aug. 15, 2024

Related U.S. Application Data

(63) Continuation of application No. 18/108,336, filed on Feb. 10, 2023, now Pat. No. 12,078,084.

(51) Int. Cl.
| | | |
|---|---|---|
| *F01K 11/02* | (2006.01) | |
| *F01K 7/22* | (2006.01) | |
| *F01K 15/02* | (2006.01) | |

(52) U.S. Cl.
CPC ............. *F01K 11/02* (2013.01); *F01K 7/223* (2013.01); *F01K 15/02* (2013.01); *F05D 2220/72* (2013.01)

(58) Field of Classification Search
CPC .......... F01K 11/02; F01K 7/223; F01K 15/02; F01K 23/10; F05D 2220/72; F05D 2220/62; F05D 2260/2322; F02C 3/22; F02C 3/305; F02C 6/18
See application file for complete search history.

(56) References Cited

U.S. PATENT DOCUMENTS

| | | | |
|---|---|---|---|
| 3,978,661 A | | 9/1976 | Cheng |
| 4,944,252 A | * | 7/1990 | Motai ................... F22B 1/1815 |
| | | | 122/7 R |
| 5,564,269 A | | 10/1996 | Briesch |
| 5,628,183 A | * | 5/1997 | Rice ...................... F22B 1/1815 |
| | | | 122/7 B |
| 5,687,570 A | | 11/1997 | Bronicki et al. |

(Continued)

FOREIGN PATENT DOCUMENTS

| | | |
|---|---|---|
| CN | 204729142 U | 10/2015 |
| CN | 104912609 B | 10/2016 |
| WO | 2020187345 A1 | 9/2020 |

OTHER PUBLICATIONS

Extended European Search Report for European Application No. 24157069.6 mailed Jul. 16, 2024.

*Primary Examiner* — Jesse S Bogue
(74) *Attorney, Agent, or Firm* — Carlson, Gaskey & Olds, P.C.

(57) ABSTRACT

A turbine engine assembly includes a core engine that generates an exhaust gas flow, a condenser where water is extracted from the exhaust gas flow, an evaporator where heat is input into the water that is extracted by the condenser into a first steam flow, a steam turbine where the first steam flow is expanded and cooled, and a superheater where additional heat is input into the first steam flow that is exhausted from the steam turbine to generate a second steam flow. The second steam flow is injected into a core flow path of the core engine.

17 Claims, 4 Drawing Sheets

(56) References Cited

U.S. PATENT DOCUMENTS

| | | | |
|---|---|---|---|
| 5,689,948 A * | 11/1997 | Frutschi | F01K 21/047 |
| | | | 60/774 |
| 5,761,896 A | 6/1998 | Dowdy et al. | |
| 5,839,269 A * | 11/1998 | Frutschi | F01K 23/106 |
| | | | 60/39.182 |
| 5,896,740 A * | 4/1999 | Shouman | F01K 21/042 |
| | | | 60/39.55 |
| 6,293,086 B1 | 9/2001 | Reynolds | |
| 10,473,029 B2 | 11/2019 | Conlon | |
| 10,934,894 B2 | 3/2021 | Copeland et al. | |
| 12,152,508 B2 * | 11/2024 | Velloso Mohedano | ................ |
| | | | F01K 21/04 |
| 2020/0263568 A1 | 8/2020 | Copeland et al. | |
| 2021/0207500 A1 * | 7/2021 | Klingels | F02C 3/305 |
| 2023/0150678 A1 * | 5/2023 | Klingels | B64D 33/04 |
| | | | 244/55 |

* cited by examiner

INCREASED WATER HEAT ABSORPTION CAPACITY FOR STEAM INJECTED TURBINE ENGINE

CROSS REFERENCE TO RELATED APPLICATION

This application is a continuation of U.S. application Ser. No. 18/108,336 filed on Feb. 10, 2023.

STATEMENT REGARDING FEDERALLY SPONSORED RESEARCH OR DEVELOPMENT

This invention was made with Government support under Contract No.: DE-AR0001561 awarded by the United States Department of Energy, Office of ARPA-E. The Government has certain rights in this invention.

TECHNICAL FIELD

The present disclosure relates generally to a steam injected turbine engine and more particularly to a steam injection system that increases a heat absorption capacity of an extracted water flow.

BACKGROUND

Reduction and/or elimination of carbon emissions generated by aircraft operation is a stated goal of aircraft manufacturers and airline operators. Turbine engines compress incoming core airflow, mix the compressed airflow with fuel that is ignited in a combustor to generate a high energy exhaust gas flow. Some energy in the high energy exhaust flow is recovered as it is expanded through a turbine section. Water can be extracted from the exhaust gas flow and transformed into a steam flow and injected into the core flow to enhance engine efficiency. Additionally, the recovered water flow can be utilized to absorb and recover heat from the exhaust gas flow. The amount of heat that can be absorbed by a recovered water flow may be limited and reduce the efficiencies gained by the injection of steam flow.

Turbine engine manufacturers continue to seek further improvements to engine performance including improvements to reduce environmental impact while improving thermal and propulsive efficiencies.

SUMMARY

A turbine engine assembly according to an example disclosed embodiment, includes, among other possible things, a core engine that generates an exhaust gas flow, a condenser where water is extracted from the exhaust gas flow, an evaporator where heat is input into the water that is extracted by the condenser into a first steam flow, a steam turbine where the first steam flow is expanded and cooled, and a superheater where additional heat is input into the first steam flow that is exhausted from the steam turbine to generate a second steam flow. The second steam flow is injected into a core flow path of the core engine.

In a further embodiment of the foregoing, the turbine engine assembly includes a pump for pressurizing water that is communicated to the evaporator. A pressure of water at the evaporator is greater than a pressure of water at the superheater.

In a further embodiment of any of the foregoing, the exhaust gas flow is in thermal communication with at least one of the evaporator and the superheater.

In a further embodiment of any of the foregoing, the evaporator and the superheater are disposed within a flow path for the exhaust gas flow.

In a further embodiment of any of the foregoing, the evaporator receives the exhaust gas flow after the superheater.

In a further embodiment of any of the foregoing, an auxiliary heat source is in thermal communication with at least one of the evaporator and the superheater.

In a further embodiment of any of the foregoing, the steam turbine includes a shaft for driving an accessory component.

In a further embodiment of any of the foregoing, the steam turbine is mechanically coupled to an engine spool.

In a further embodiment of any of the foregoing, the turbine engine assembly includes a fuel system where a hydrogen based fuel flow is communicated to a combustor of the core engine.

An aircraft propulsion system according to another example disclosed embodiment, includes, among other possible things, a core engine assembly that includes a compressor where an inlet airflow is compressed and communicated to a combustor where a compressed core flow is mixed with fuel and ignited to generate an exhaust gas flow that is expanded through a turbine section to generate shaft power. The aircraft propulsion system includes a hydrogen based fuel system for supplying a hydrogen based fuel to the combustor, a condenser where water from the exhaust gas flow is recovered, an evaporator where heat from the exhaust gas flow is input into the water that is extracted by the condenser to generate a first steam flow, a steam turbine where the first steam flow is expanded and cooled, and a superheater where additional heat from the exhaust gas flow is input into the first steam flow that is exhausted from the steam turbine to generate a second steam flow. The second steam flow is injected into a core flow path of the core engine.

In a further embodiment of the foregoing, the aircraft propulsion system includes a pump where water that is extracted from the condenser is pressurized before being communicated to the evaporator.

In a further embodiment of any of the foregoing, an auxiliary heat source is in thermal communication to provide additional heat to at least one of the evaporator and the superheater.

In a further embodiment of any of the foregoing, the evaporator and the superheater are parallel to the exhaust gas flow.

In a further embodiment of any of the foregoing, the steam turbine includes a shaft for driving an accessory component.

In a further embodiment of any of the foregoing, the evaporator is parallel to the superheater within the gas flow.

In a further embodiment of any of the foregoing, the evaporator and the superheater include different portions of a multi-pass heat exchanger.

A method of operating an aircraft propulsion system according to another example disclosed embodiment, includes, among other possible things, transforming a water flow into a first steam flow with a first heat input, expanding the first steam flow to generate shaft power in a steam turbine, reheating a flow that is exhausted from the steam turbine with a second heat input to generate a second steam flow, and injecting the second steam flow into a core engine core flow path.

In a further embodiment of the foregoing, the method includes pressurizing the water flow before transformation into the first steam flow.

In a further embodiment of any of the foregoing, the method includes communicating the first heat input and the second heat input from an exhaust gas flow that is generated by the core engine.

In a further embodiment of any of the foregoing, the method includes communicating a heat input from a secondary heat source to generate one of the first steam flow and the second steam flow.

Although the different examples have the specific components shown in the illustrations, embodiments of this invention are not limited to those particular combinations. It is possible to use some of the components or features from one of the examples in combination with features or components from another one of the examples.

These and other features disclosed herein can be best understood from the following specification and drawings, the following of which is a brief description.

DETAILED DESCRIPTION

Figure 1:
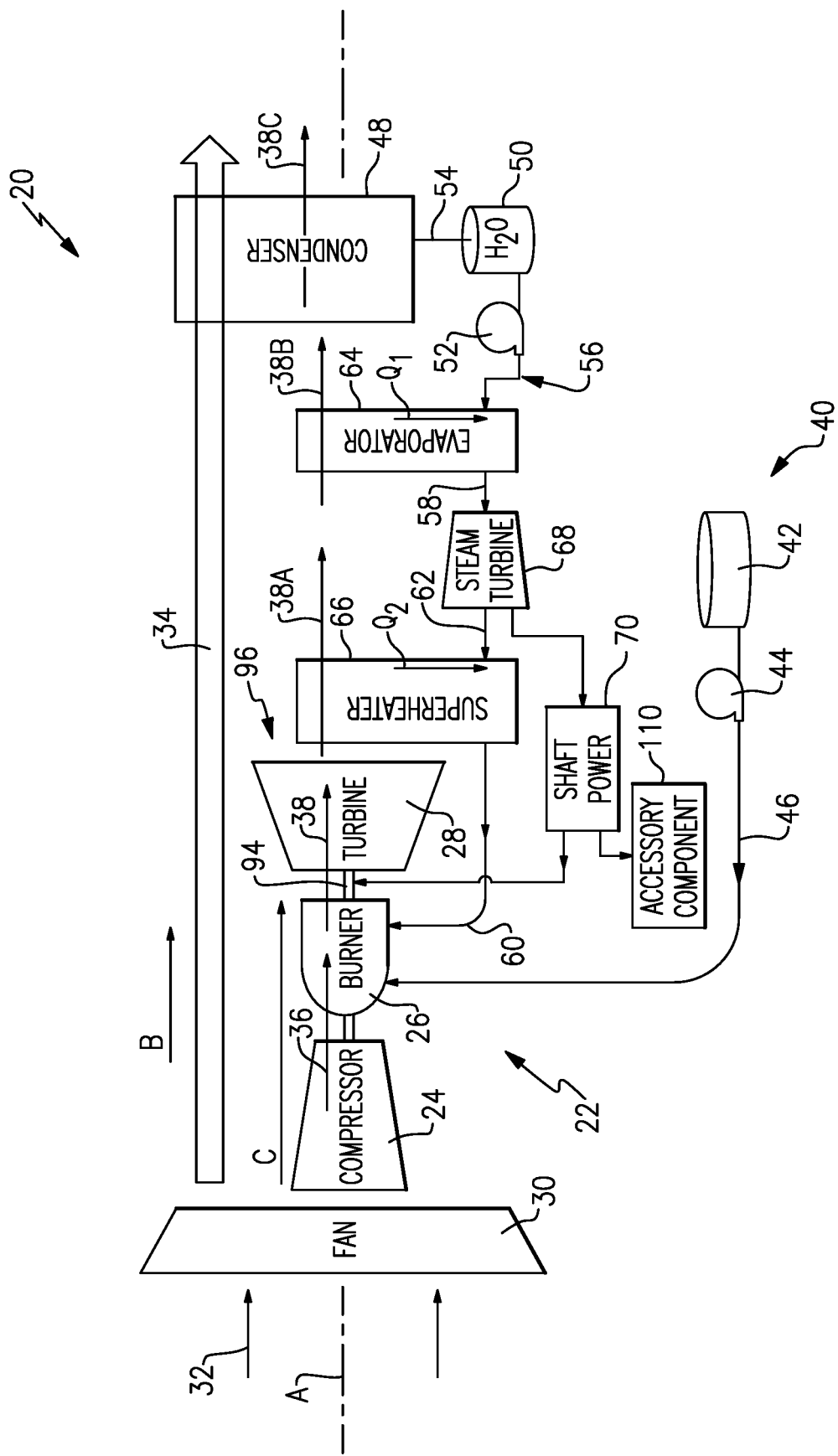
FIG. 1 is a schematic view of an example turbine engine embodiment.

FIG. 1 schematically illustrates an engine assembly 20 where steam is injected into the core flow path C to increase mass flow through a turbine section 28 and thereby provide increased power without additional work from a compressor section 24. Water for generating the steam is recovered from the exhaust gas flow. The water is further utilized to recover thermal energy from the exhaust gas flow 38. A steam turbine 68 provides a means of increasing the heat absorption capacity of the recovered water without a corresponding increase in the amount of water recovered from the exhaust gas flow 38.

The engine assembly 20 includes a core engine 22 with a fan 30, the compressor section 24, a combustor section 26 and the turbine section 28 disposed serially along an engine axis A. The compressor section 24 is coupled to the turbine section 28 by a shaft 94 to define an engine spool 96. The fan 30 drives inlet airflow 32 into a bypass flow path B and a core flow path C. In the compressor section 24, a core flow 36 is compressed and communicated to the combustor section 26. In the combustor section 26, compressed core airflow 36 is mixed with a fuel flow 46 and ignited to generate the high energy combusted exhaust gas flow 38 that is expanded through the turbine section 28 to extract energy to drive the compressor section 24 and the fan 30. The engine assembly 20 is shown and described by way of example and other engine configurations and architectures may be utilized within the contemplation and scope of this disclosure.

A steam flow 60 is injected into the core flow 36 and increases mass flow through the turbine section 28 and thereby increases engine power and efficiency. The increased engine power is due to an increasing mass flow through the turbine section 28 without a corresponding increase in work from the compressor section 24.

A fuel system 40 includes a fuel tank 42 and a fuel pump 44 for generating the fuel flow 46. The example fuel system 40 is configured to provide a hydrogen based fuel such as a liquid hydrogen. Although hydrogen is disclosed by way of example, other non-carbon based fuels could be utilized and are within the contemplation of this disclosure. Moreover, the disclosed features may also be beneficial in an engine configured to operate with traditional hydrocarbon based fuels.

Energy from the exhaust flow is recovered as heat absorbed by the water recovered in a condenser 48. A water flow 54 at or near ambient pressures is communicated to a water tank 50 a pump 52 communicates a pressurized water flow 56 to an evaporator 64. In one example embodiment, the pressurized water flow 56 is of high pressure in the range of between 1500 PSI and 5000 PSI. In another example embodiment, the pressurize water flow 56 is communicated to the evaporator as a pressure of about 2000 PSI.

The evaporator 64 inputs a first amount of heat Q1 into the pressurized water flow 56 to generate a first steam flow 58. The first steam flow 58 is expanded through a steam turbine 68 to generate shaft power 70. Additionally, expansion through the steam turbine 68 cools the first steam flow 58 to generate a cooled steam flow 62 that is exhausted from the steam turbine 68.

The cooled steam flow 62 has an increased capacity to absorb heat from a heat source as compared to the first steam flow 58. The cooled steam flow 62 is of a lower pressure and communicated to a superheater 66. The superheater 66 is closer to the turbine section 28 than the evaporator 64 and is therefore exposed to a higher temperature exhaust gas flow portion 38A as compared to the exhaust gas flow portion 38B that is communicated downstream to the evaporator 64. Expansion through the steam turbine 68 reduces the pressure of the cooled flow 62 and the pressures within the superheater 66.

A second heat input Q2 into the cooled steam flow 62 produces a second steam flow 60 that is injected into the core flow 36. In one example embodiment, the second steam flow 60 is injected into the core flow 36 at the combustor 26. However, the second steam flow 60 may be injected upstream of the combustor 26 or other locations within the core flow path C.

The steam turbine 68 generates the shaft power 70 that can be used to drive engine and/or aircraft accessory components schematically shown at 110. The shaft power 70 may also be coupled to the engine spool 96 for providing additional power for engine operation. Moreover, although a single steam turbine 68 is disclosed by way of example, several steam turbines could be utilized and receive the first steam flow 58 and emit a cooled and lower pressure cooled flow 62.

In operation, water 54 is extracted from a portion of the exhaust gas flow portion C in communication with the condenser 48. The exhaust flow portion C passing through the condenser 48 has rejected some heat in the evaporator 64 and the superheater 66. Accordingly, the exhaust gas flow portion 38C is cooler than it would be upstream of the condenser 48. The condenser 48 is also cooled by a cooling flow to cool the portion of the exhaust gas flow portion 38C and condense water. In one disclosed embodiment, the bypass airflow 34 provides cooling as a heat sink for the condenser 48. Other cooling flows could be utilized and are within the scope and contemplation of this disclosure.

The recovered water 54 is pressurized in pump 52 to a pressure of about 2000 PSI and communicated to the evaporator 64. The first heat input Q1 from the exhaust gas flow portion 38B in the evaporator 64 is absorbed by the pressurized water flow 56 that results in the generation of the first steam flow 58. Other heat sources may also input heat into the pressurized water flow 56.

Figure 2:
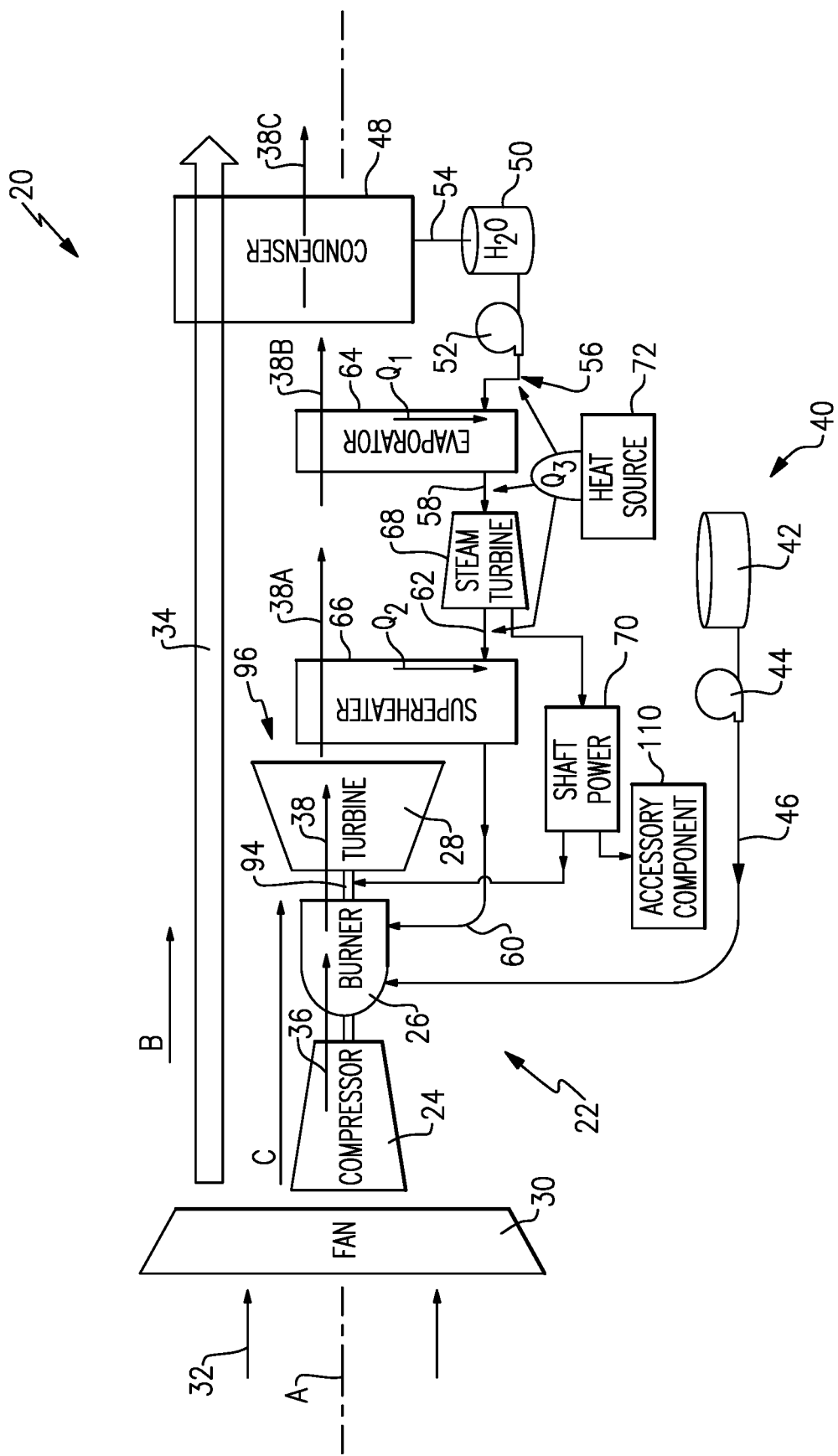
FIG. 2 is a schematic view of another example turbine engine embodiment.

Referring to FIG. 2, with continued reference to FIG. 1, a heat source 72 is schematically shown and inputs heat into the pressurized water flow 56. Additionally, heat from the heat source 72 may be input anywhere along the water flow path to recover thermal energy. The heat source 72 may be a fuel system, lubrication system, electric system or any other engine or aircraft system that generates heat or requires cooling.

The first steam flow 58 has a limited capacity for absorbing additional heat. The capacity for heat absorption is increased by cooling expansion through the steam turbine 68. Some of the recovered heat energy is utilized to generate shaft power 70. The expanded and cooled flow 62 exhausted from the steam turbine 68 is much cooler than the first steam flow 58 and therefore is of an increased capacity for absorbing heat.

An additional amount of heat schematically shown as Q2 is extracted from the exhaust gas flow portion 38A communicated through the superheater 66. The exhaust gas flow portion 38A is higher in temperature due to the closer location to an exit of the turbine section 28. The cooled flow 62 absorbs heat energy from the gas flow portion 38A and is transformed into the second steam flow 60. The second steam flow 60 is communicated to the combustor 26 and injected into the core flow 36.

Figure 3:
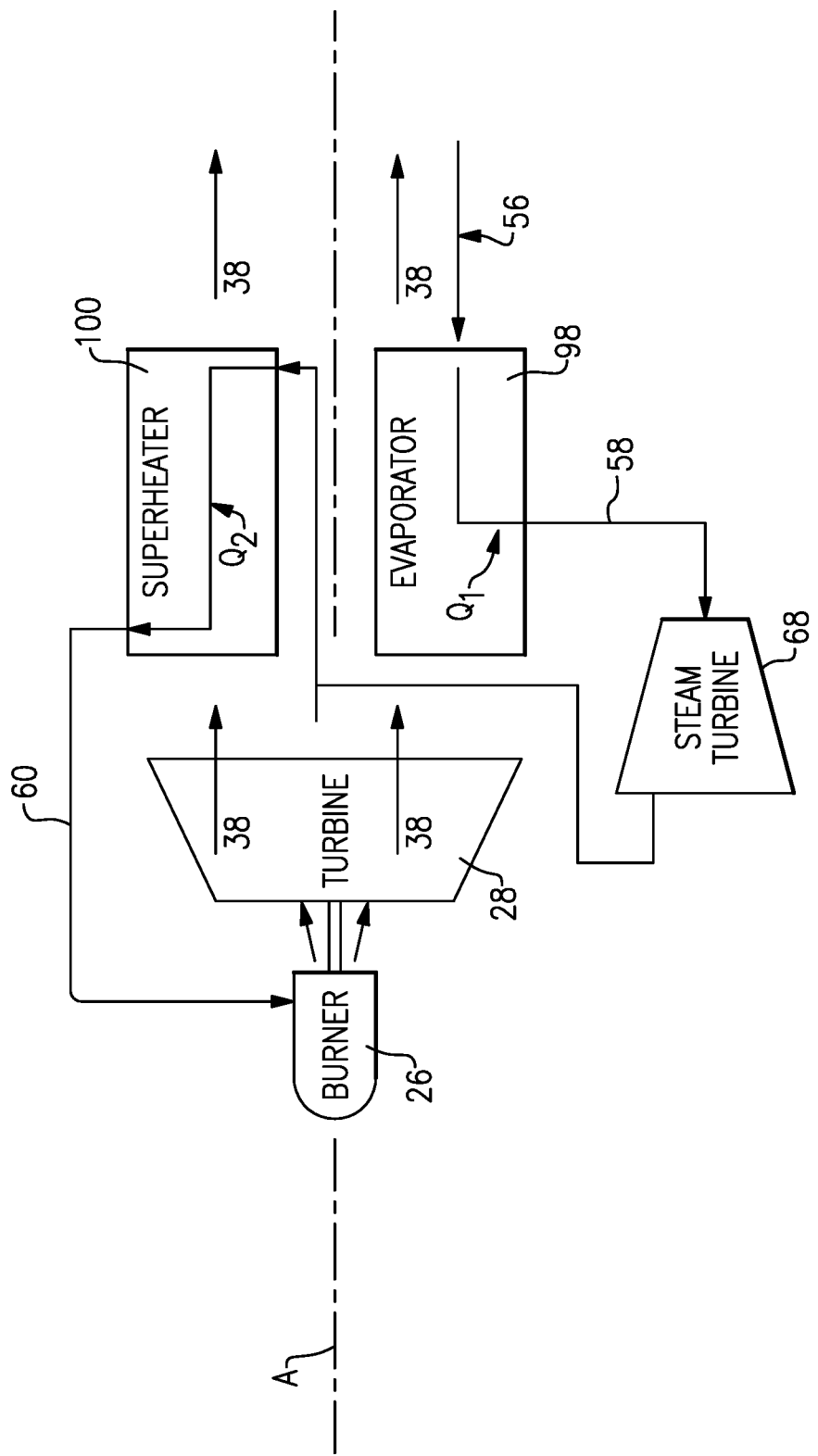
FIG. 3 is a schematic view of a portion of another example turbine engine embodiment.

Referring to FIG. 3, an evaporator 98 and superheater 100 are shown in a configuration where both are parallel to the exhaust gas stream 38. The water flow 56 is first communicated to the evaporator 98 and heated by a first quantity of heat Q1 to generate the first steam flow 58. The first steam flow 58 is communicated to the steam turbine 68. The first steam flow 58 expands through the steam turbine 68 and exhausted to the superheater 100. The first steam flow 58 is further heated by a second amount of heat Q2 to generate the second steam flow 60. The second steam flow 60 may than be communicated to the burner 26. The example evaporator 98 and superheater 100 are parallel to each other and to the gas flow 38 along the axis A.

Figure 4:
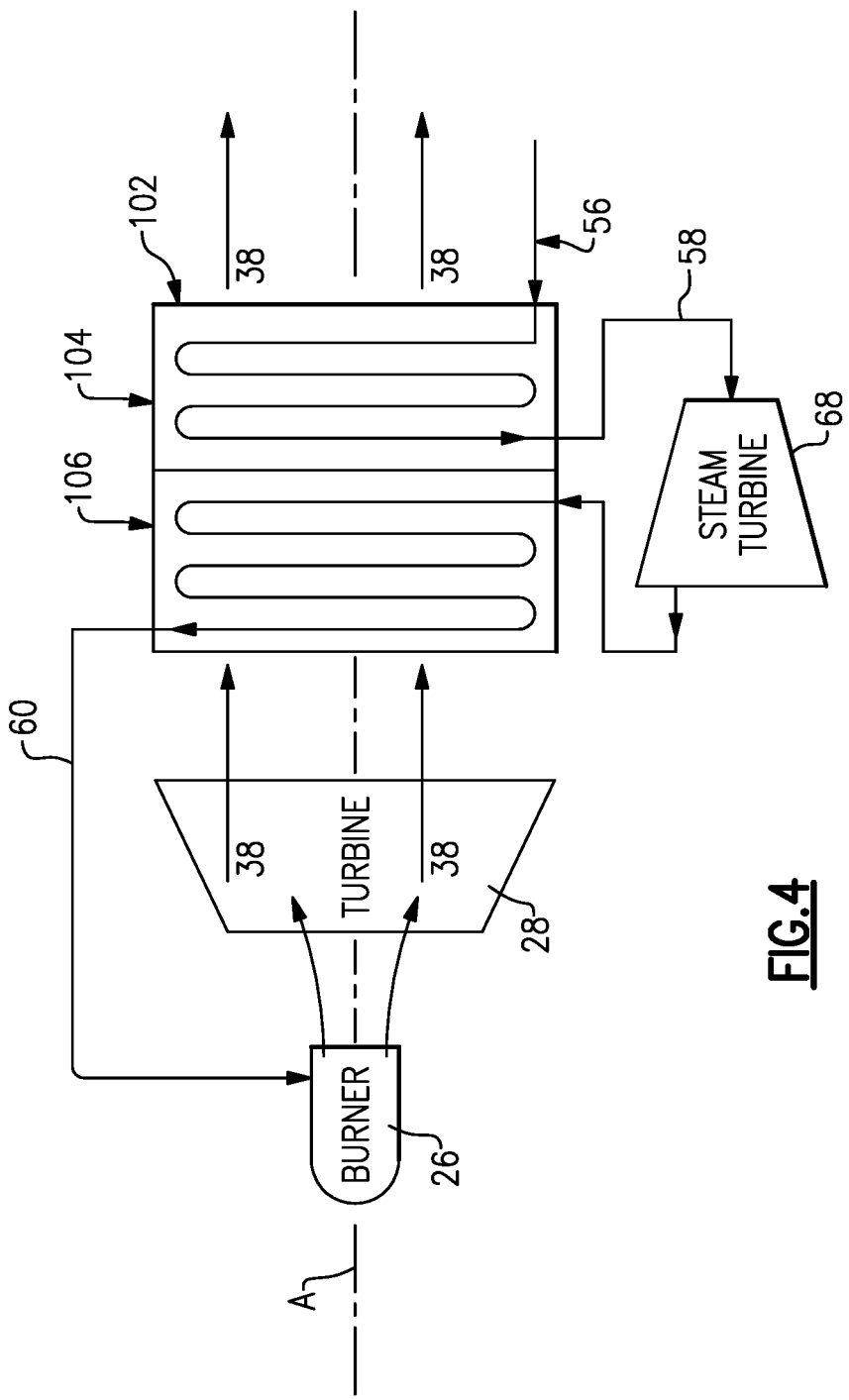
FIG. 4 is a schematic view of a portion of another example turbine engine embodiment.

Referring to FIG. 4, a heat exchanger assembly 102 is schematically shown and incorporates both an evaporator 104 and a superheater 106 into a common assembly. The heat exchange assembly 102 comprises a multi-pass heat exchanger with separate flow circuits that corresponds to the evaporator 104 and the superheater 106. Operation of the evaporator 104 and the superheater 106 is the same as shown and described in the previously describe example embodiments. Incorporation of the superheater 106 and the evaporator 104 into the assembly 102 can provide further options for installation and integration into a turbine engine 20.

Accordingly, the example engine 20 uses the steam turbine 68 to both generate a mechanical output from recovered heat and to increase a heat absorption capacity of the extracted water without increasing the amount of water extracted or the size of the condenser 48.

Although an example embodiment has been disclosed, a worker of ordinary skill in this art would recognize that certain modifications would come within the scope of this disclosure. For that reason, the following claims should be studied to determine the scope and content of this disclosure.

What is claimed is:

1. A turbine engine assembly comprising:
   a core engine generating an exhaust gas flow communicated through an exhaust gas flow path;
   a condenser where water is extracted from the exhaust gas flow;
   an evaporator disposed within an exhaust gas flow path where heat is input into the water extracted by the condenser, without superheat to generate a first steam flow;
   a steam turbine where the first steam flow is expanded and cooled; and
   a superheater disposed within the exhaust gas flow path such that a flow of exhaust gas through the superheater is parallel to a flow of exhaust gas flow through the evaporator, wherein all of the first steam flow exhausted from the steam turbine is heated in the superheater to generate a second steam flow, wherein the second steam flow is injected into a core flow path of the core engine.

2. The turbine engine assembly as recited in claim 1, including a pump for pressurizing water communicated to the evaporator, wherein a pressure of water communicated to the evaporator is greater than a pressure of water communicated to the superheater.

3. The turbine engine assembly as recited in claim 1, wherein the exhaust gas flow is in thermal communication with at least one of the evaporator and the superheater.

4. The turbine engine assembly as recited in claim 1, wherein an auxiliary heat source is in thermal communication with at least one of the evaporator and the superheater.

5. The turbine engine assembly as recited in claim 1, wherein the steam turbine includes a shaft for driving an accessory component.

6. The turbine engine assembly as recited in claim 1, wherein the steam turbine is mechanically coupled to an engine spool.

7. The turbine engine assembly as recited in claim 1, including a fuel system where a hydrogen based fuel flow is communicated to a combustor of the core engine.

8. An aircraft propulsion system comprising:
   a core engine assembly including a compressor where an inlet airflow is compressed and communicated to a combustor where a compressed core flow is mixed with fuel and ignited to generate an exhaust gas flow that is expanded through a turbine section to generate shaft power;
   a hydrogen based fuel system for supplying a hydrogen based fuel to the combustor;
   a condenser disposed in communication with the exhaust gas flow within an exhaust gas flow path where water from the exhaust gas flow is recovered;
   an evaporator disposed within the exhaust gas flow path where heat from the exhaust gas flow is input into the water extracted by the condenser to generate a first steam flow;
   a steam turbine where the first steam flow is expanded and cooled; and
   a superheater disposed parallel to the evaporator within the exhaust gas flow path such that exhaust gas flow through each of the superheater and evaporator are parallel to each other and an engine longitudinal axis, wherein additional heat from the exhaust gas flow is input into all of the first steam flow exhausted from the steam turbine by the superheater to generate a second steam flow, wherein the second steam flow is injected into a core flow path of the core engine.

9. The aircraft propulsion system as recited in claim 8, including a pump where water extracted from the condenser is pressurized before being communicated to the evaporator.

10. The aircraft propulsion system as recited in claim 8, wherein an auxiliary heat source is in thermal communication to provide additional heat to at least one of the evaporator and the superheater.

11. The aircraft propulsion system as recited in claim 8, wherein the evaporator and the superheater are parallel to the exhaust gas flow.

12. The aircraft propulsion system as recited in claim 8, wherein the steam turbine includes a shaft for driving an accessory component.

13. The aircraft propulsion system as recited in claim 8, wherein the evaporator is parallel to the superheater within the gas flow.

14. A method of operating an aircraft propulsion system comprising:
    transforming a water flow into a first steam flow with a first heat input in an evaporator disposed within an exhaust gas flow path;
    expanding the first steam flow to generate shaft power in a steam turbine;
    reheating the entire first steam flow exhausted from the steam turbine with a second heat input within a superheater disposed parallel to the evaporator within the exhaust gas flow path such that both the superheater and the evaporator are exposed to the exhaust flow at a common axial position, wherein the second heat input generates a second steam flow; and
    injecting the second steam flow into a core engine core flow path.

15. The method as recited in claim 14, including pressurizing the water flow before transformation into the first steam flow.

16. The method as recited in claim 14, including communicating the first heat input and the second heat input from an exhaust gas flow generated by the core engine.

17. The method as recited in claim 14, including communicating a heat input from a secondary heat source to further heat at least one of the first steam flow and the second steam flow.

* * * * *